(12) United States Patent
Sahirad et al.

(10) Patent No.: US 12,391,393 B2
(45) Date of Patent: Aug. 19, 2025

(54) AIRCRAFT PROPULSION SYSTEM WITH INLET AIR MONITORING SYSTEM AND METHOD

(71) Applicant: Raytheon Technologies Corporation, Farmington, CT (US)

(72) Inventors: Cameron B. Sahirad, Simsbury, CT (US); Alek Gavrilovski, Atlanta, GA (US); Lichu Zhao, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/224,430

(22) Filed: Jul. 20, 2023

(65) Prior Publication Data

US 2025/0026482 A1 Jan. 23, 2025

(51) Int. Cl.
  *B64D 33/02* (2006.01)
  *F02C 7/05* (2006.01)
(52) U.S. Cl.
  CPC ............... *B64D 33/02* (2013.01); *F02C 7/05* (2013.01); *B64D 2033/0246* (2013.01)
(58) Field of Classification Search
  CPC .. F02C 7/05; F02C 7/052; F02C 7/055; F02C 7/057; B64D 33/02; B64D 33/0246
  See application file for complete search history.

(56) References Cited

U.S. PATENT DOCUMENTS

| | | | |
|---|---|---|---|
| 8,074,498 B2 | 12/2011 | Agrawal | |
| 8,204,671 B2 | 6/2012 | Agrawal | |
| 8,459,103 B2 | 6/2013 | Khibnik | |
| 10,845,294 B1 | 11/2020 | Lincoln | |
| 11,492,967 B2 | 11/2022 | Lincoln | |
| 11,961,024 B1* | 4/2024 | Gentry | G06Q 10/063116 |
| 2006/0047403 A1* | 3/2006 | Volponi | G05B 23/0221 |
| | | | 701/100 |
| 2009/0112519 A1* | 4/2009 | Novis | F01D 21/14 |
| | | | 702/183 |

(Continued)

FOREIGN PATENT DOCUMENTS

| | | | | |
|---|---|---|---|---|
| CN | 112589678 A | * | 4/2021 | ............. B03C 3/017 |
| EP | 1978222 A2 | * | 10/2008 | ............. B01D 45/14 |

(Continued)

OTHER PUBLICATIONS

EP Search Report for EP Patent Application No. 24189693.5 dated Jan. 3, 2025.

*Primary Examiner* — Craig Kim
(74) *Attorney, Agent, or Firm* — Getz Balich LLC

(57) ABSTRACT

A method of producing an operational data for an aircraft turbine engine is provided that including: sensing an inlet airflow to an aircraft turbine engine for CMAS particulate matter, the sensing performed during one or more ground portions of a flight operational cycle of the turbine engine, the sensing producing sensor signals indicative of the presence or absence of the CMAS particulate matter; determining a presence or absence of an exposure by the turbine engine to a CMAS environment based on the sensor signals; and producing an operational data indicative of the presence or absence of said exposure by the turbine engine to said CMAS environment.

19 Claims, 8 Drawing Sheets

(56) References Cited

U.S. PATENT DOCUMENTS

| | | | |
|---|---|---|---|
| 2011/0179763 A1* | 7/2011 | Rajamani | F04D 29/701 60/39.092 |
| 2012/0324987 A1* | 12/2012 | Khibnik | G01N 15/0266 73/112.01 |
| 2014/0236450 A1* | 8/2014 | Care | F01D 5/027 701/100 |
| 2016/0177823 A1* | 6/2016 | Younes | B64D 33/02 55/306 |
| 2020/0131996 A1 | 4/2020 | Hanlon | |
| 2021/0003485 A1 | 1/2021 | Wagner | |
| 2021/0332763 A1* | 10/2021 | Saripella | F02C 9/18 |
| 2022/0187202 A1 | 6/2022 | Lincoln | |
| 2023/0027449 A1 | 1/2023 | Castillo-Garza | |
| 2023/0342424 A1* | 10/2023 | Lee | G06N 3/02 |
| 2023/0349300 A1* | 11/2023 | Seto | G05B 23/0221 |
| 2024/0141833 A1* | 5/2024 | Akcayoz | B64D 33/02 |

FOREIGN PATENT DOCUMENTS

| | | | | |
|---|---|---|---|---|
| EP | 3889395 A1 | 10/2021 | | |
| GB | 2318752 A | * | 5/1998 | C08J 3/124 |

\* cited by examiner

AIRCRAFT PROPULSION SYSTEM WITH INLET AIR MONITORING SYSTEM AND METHOD

BACKGROUND OF THE INVENTION

1. Technical Field

The present disclosure relates gas turbine engines in general and to inlet air monitoring systems and methods in particular.

2. Background Information

Ingestion of debris is a major driver for maintenance on gas turbine engines. An example of debris that may be ingested is siliceous mineral debris that is often referred to as calcium-magnesium-alumino-silicate, or by the acronym "CMAS" for short. Fleet data does not provide information relating to when a turbine engine operates within a CMAS environment. A method and/or system that provides information relating to when a turbine engine operates within a CMAS environment would be desirable.

SUMMARY

According to an aspect of the present disclosure, a method of producing an operational data for an aircraft turbine engine is provided that includes: sensing an inlet airflow to an aircraft turbine engine for CMAS particulate matter, the sensing performed during one or more ground portions of a flight operational cycle of the turbine engine, the sensing producing sensor signals indicative of the presence or absence of the CMAS particulate matter; determining a presence or absence of an exposure by the turbine engine to a CMAS environment based on the sensor signals; and producing an operational data indicative of the presence or absence of said exposure by the turbine engine to said CMAS environment.

In any of the aspects or embodiments described above and herein, the sensing may be performed using an inlet debris monitoring system (IDMS) that uses a pair of rings to sense changes in electrostatic charge.

In any of the aspects or embodiments described above and herein, the determining may include evaluating the sensor signals relative to a baseline.

In any of the aspects or embodiments described above and herein, the baseline may be a fixed value based on sensing data.

In any of the aspects or embodiments described above and herein, the sensing data may be collected over a plurality of flights of the turbine engine.

In any of the aspects or embodiments described above and herein, the baseline may be indicative of a density of CMAS particulate matter within the inlet airflow that is not associated with deleterious effect to the turbine engine.

In any of the aspects or embodiments described above and herein, the step of producing operational data may include producing a flag indicative of the presence or absence of a CMAS environment.

In any of the aspects or embodiments described above and herein, the step of producing operational data may include producing data relating to a magnitude of a CMAS environment to which the turbine engine is exposed.

In any of the aspects or embodiments described above and herein, the step of producing operational data may include producing data relating to a cumulative exposure of the turbine engine to one or more said CMAS environments.

In any of the aspects or embodiments described above and herein, the cumulative exposure may be determined based on sensor signals collected over a plurality of flight operational cycles of the turbine engine.

In any of the aspects or embodiments described above and herein, the cumulative exposure may be determined based on sensor signals collected over a predetermined amount of time elapsed during a plurality of flight operational cycles of the turbine engine.

In any of the aspects or embodiments described above and herein, the one or more ground portions of a flight operational cycle of the turbine engine includes a ground idle portion and a takeoff portion, and the sensing may be performed only during the ground idle portion and the takeoff portion.

In any of the aspects or embodiments described above and herein, the one or more ground portions of a flight operational cycle of the turbine engine includes a takeoff portion and a landing portion, and the sensing may be performed only during the takeoff portion and the landing portion.

In any of the aspects or embodiments described above and herein, the one or more ground portions of a flight operational cycle of the turbine engine includes a takeoff portion, and the sensing may be performed only during the takeoff portion.

According to an aspect of the present disclosure, a system for producing operational data for an aircraft turbine engine having an airflow inlet is provided. The system includes an inlet debris monitoring system (IDMS) and a controller. The IDMS is configured to sense an inlet air flow to the turbine engine for CMAS particulate matter. The IDMS is configured to produce sensor signals indicative of the presence or absence of the CMAS particulate matter. The controller is in communication with the IDMS and a non-transitory memory storing instructions, which instructions when executed cause the controller to: control the IDMS to sense the inlet air flow for CMAS particulate matter during one or more ground portions of a flight operational cycle of the turbine engine, and produce the sensor signals indicative of the presence or absence of the CMAS particulate matter; determine a presence or absence of an exposure by the turbine engine to a CMAS environment based on the sensor signals; and produce an operational data indicative of the presence or absence of said exposure by the turbine engine to said CMAS environment.

In any of the aspects or embodiments described above and herein, in the determination of the presence or absence of exposure by the turbine engine to a CMAS environment based on the sensor signals, the instructions may cause the controller to evaluate the sensor signals relative to a baseline value.

In any of the aspects or embodiments described above and herein, in the production of operational data indicative of the presence or absence of exposure to a CMAS environment, the instructions may cause the controller to produce a flag indicative of the presence or absence of a CMAS environment.

In any of the aspects or embodiments described above and herein, in the production of operational data indicative of the presence or absence of exposure to a CMAS environment, the instructions may cause the controller to produce data relating to a magnitude of a CMAS environment to which the turbine engine is exposed.

In any of the aspects or embodiments described above and herein, in the production of operational data indicative of the presence or absence of exposure to a CMAS environment, the instructions may cause the controller to produce data relating to a cumulative exposure of the turbine engine to one or more CMAS environments.

In any of the aspects or embodiments described above and herein, the one or more ground portions of a flight operational cycle of the turbine engine includes a takeoff portion, and controller may control the IDMS to sense the inlet air flow for CMAS particulate matter the sensing only during the ground idle portion.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
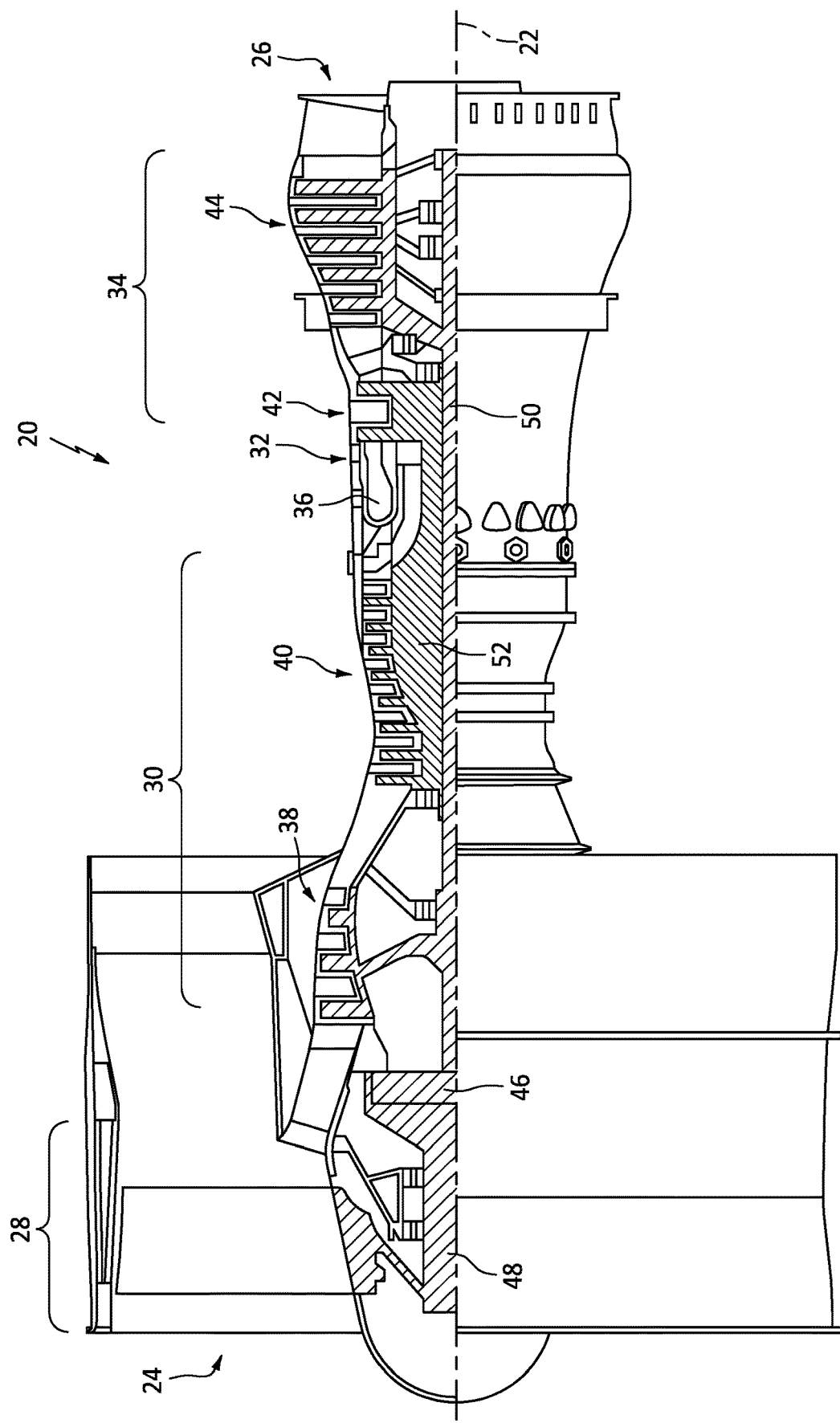
FIG. 1 is a diagrammatic sectional view of a gas turbine engine embodiment.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes an annular combustor 36. The compressor section includes a low-pressure compressor (LPC) 38 and a high-pressure compressor (HPC) 40. The turbine section 34 includes a high-pressure turbine (HPT) 42 and a low-pressure turbine (LPT) 44. In the embodiment shown in FIG. 1, the engine sections are arranged sequentially along the centerline 22 within an engine housing. The fan section 28 is connected to a geared architecture 46, for example, through a fan shaft 48. The geared architecture 46 and the LPC 38 are connected to and driven by the LPT 44 through a low-speed shaft 50. The HPC 40 is connected to and driven by the HPT 42 through a high-speed shaft 52. The terms "forward", "leading", "aft", "trailing" are used herein to indicate the relative position of a component or surface. As air passes through the engine 20, a "leading edge" of a stator vane or rotor blade encounters the air before the "trailing edge" of the same. In a conventional axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine diagrammatically shown in FIG. 1 is an example provided to facilitate the description herein. The present disclosure is not limited to any particular gas turbine engine configuration, including the two-spool engine configuration shown, and may be utilized with single spool gas turbine engines as well as three spool gas turbine engines and the like.

During operation, air enters the gas turbine engine 20 through the airflow inlet 24 and may be directed through the fan section 28 and into a core gas path. The gas traveling along the core gas path is directed through the engine sections 30, 32, 34 and exits the gas turbine engine 20 through the airflow exhaust 26 to provide forward engine thrust. Within the combustor section 32, fuel is injected into a combustor 36 and mixed with compressed air. This fuel-air mixture is ignited to power the gas turbine engine 20. The non-combusted air and combustion products produced in the combustor 36 pass to the turbine section 34 where they power the turbine section 34.

Figure 2:
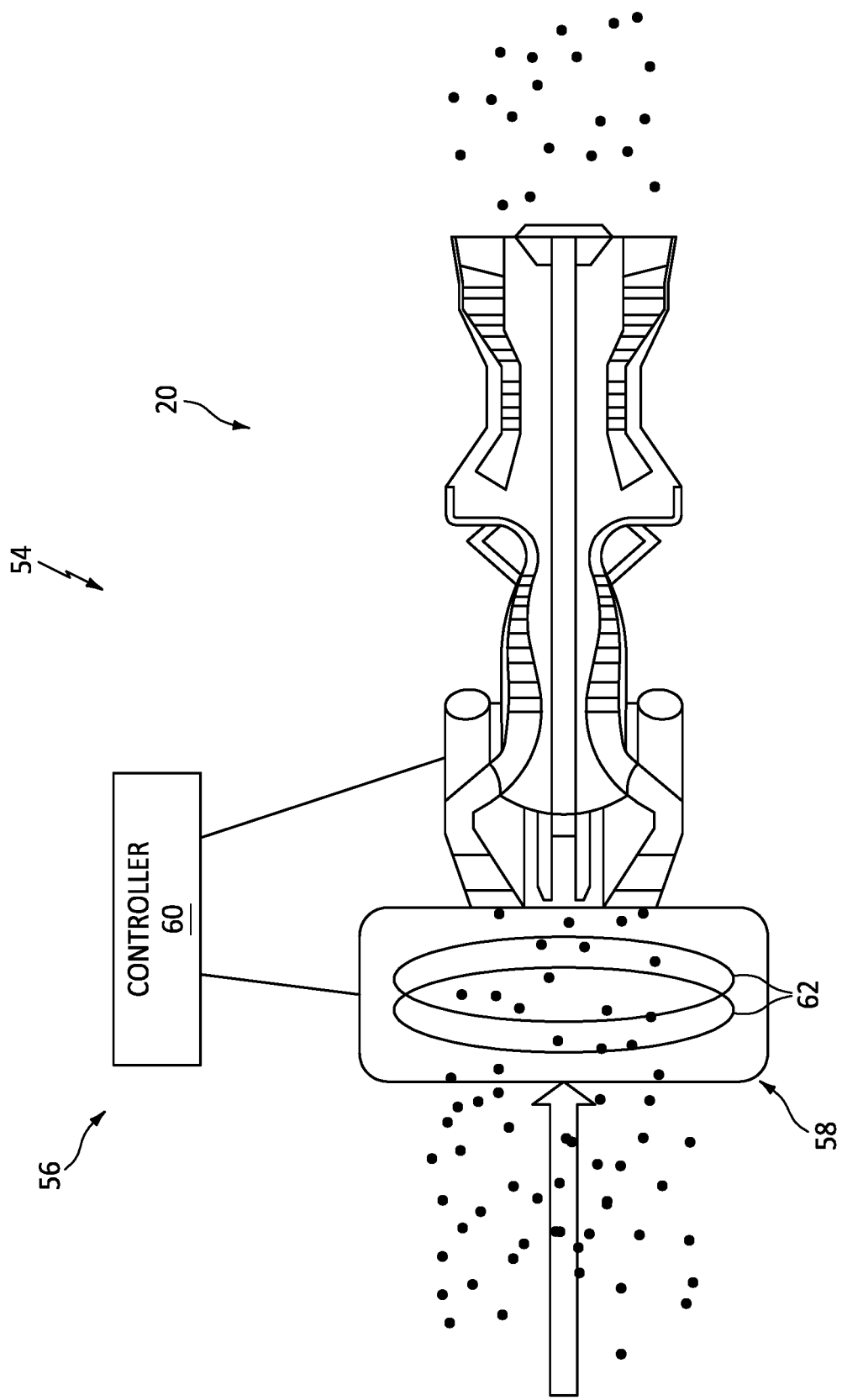
FIG. 2 is a diagrammatic representation of a present disclosure aircraft propulsion system, including a turbine engine and an inlet air monitoring system.

Referring to FIG. 2, an embodiment of a present disclosure aircraft propulsion system 54 that includes a turbine engine 20 with an inlet air monitoring system 56 is diagrammatically shown. As will be detailed herein, the inlet air monitoring system is configured to produce operational data relating to the turbine engine. The inlet air monitoring system 56 includes an inlet debris monitoring system 58 (IDMS) disposed in the airflow inlet of the engine to sense a flow of ambient air entering the airflow inlet 24 of the engine. The inlet air monitoring system 56 includes a controller 60 configured to perform the functions detailed herein. The controller 60 may be independent of the IDMS 58 and in communication with the IDMS 58, or the controller 60 may be integral with the IDMS 58. The present disclosure is not limited to any particular type of IDMS. A non-limiting example of an acceptable IDMS 58 is one that includes a pair of axially spaced apart ring sensors 62 configured to be disposed at a forward position to permit sensing of ambient air entering the engine 20. The ring sensors 62 are configured to sense changes in electrostatic charge caused by CMAS particulate matter passing through the region enclosed by the ring sensors 62. The specific placement of the ring sensors 62 may vary depending on the aircraft application. For example, some aircraft applications may include an inlet duct that directs ambient air into the airflow inlet of the engine 20. Other aircraft applications may include a nacelle that includes an inlet that extends forward of the airflow inlet of the engine 20. The present disclosure is not limited to any particular placement of the ring sensors other than the ring sensors 62 being positioned at a position to sense airflow into the engine. The ring sensors 62 may be connected to signal processing hardware (e.g., a charge amplifier, a signal conditioner unit, or the like) which hardware may in turn be in signal communication with the controller 60 for data acquisition and processing.

The controller 60 may also be in communication with other components within the system 56, such as sensors and other controllers associated with the engine (e.g., the full authority digital engine control or "FADEC") and the like. The controller 60 may be in communication with these components to control and/or receive signals therefrom to perform the functions described herein. The controller 60 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any function described herein to enable the system 56 to accomplish the same algorithmically and/or coordination of system 56 components. The controller 60 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 60 may include, or may be in communication with, an input device that enables a user to enter data and/or instructions, and may include, or be in communication with an output device. Communications between the controller 60 and other system 56 components may be via a hardwire connection or via a wireless connection.

The above description of an IDMS 58 is a non-limiting example of an IDMS and the present disclosure is not limited to including any particular type of IDMS.

Aircraft powered by one or more turbine engines may on occasion operate in an environment where the potential for ingesting CMAS particulate matter is substantially higher than average. A ground environment, for example, may have a greater CMAS presence because of the current environmental situation (e.g., weather), or the ground environment may inherently have a greater CMAS presence (e.g., a desert environment). Regardless of the cause of the CMAS environment, the exposure of the engine 20 to the CMAS environment can have deleterious effects on the health of the engine 20, including the useful life of components within the engine 20. The present disclosure provides a system and method that utilizes a data feature that is representative of the presence or absence of CMAS particulates within the inlet air of the engine 20 and that produces useful information (e.g., operational data) that can be used to facilitate maintenance; e.g., component lifting.

Embodiments of the present disclosure are configured to determine one or more of a) if an engine 20 is operating in a CMAS environment; b) a measure of the amount of CMAS particulate entrained within the inlet air and therefore a measure of the extent or magnitude of the CMAS environment exposure; or c) the cumulative operating exposure of the engine 20 to a CMAS environment, or any combination thereof. The amount of CMAS particulate entrained within the inlet air will be referred to herein as the CMAS particulate density within the inlet air. The terms "density" or "particulate density" are used to describe a measure of the amount of CMAS particulate that is entrained within the airflow. The term "density" as used here does not refer to mass per unit volume of the particulates. In some applications, the amount of CMAS particulate that is entrained within the airflow may be measured by the collective particulate mass per unit volume of the inlet airflow. In some applications, the amount of CMAS particulate that is entrained within the inlet airflow may be measured by the collective particulate volume per unit volume of the inlet airflow. The present disclosure is not limited to these examples of how the amount of CMAS particulate present within the inlet airflow may be measured.

Figure 3:
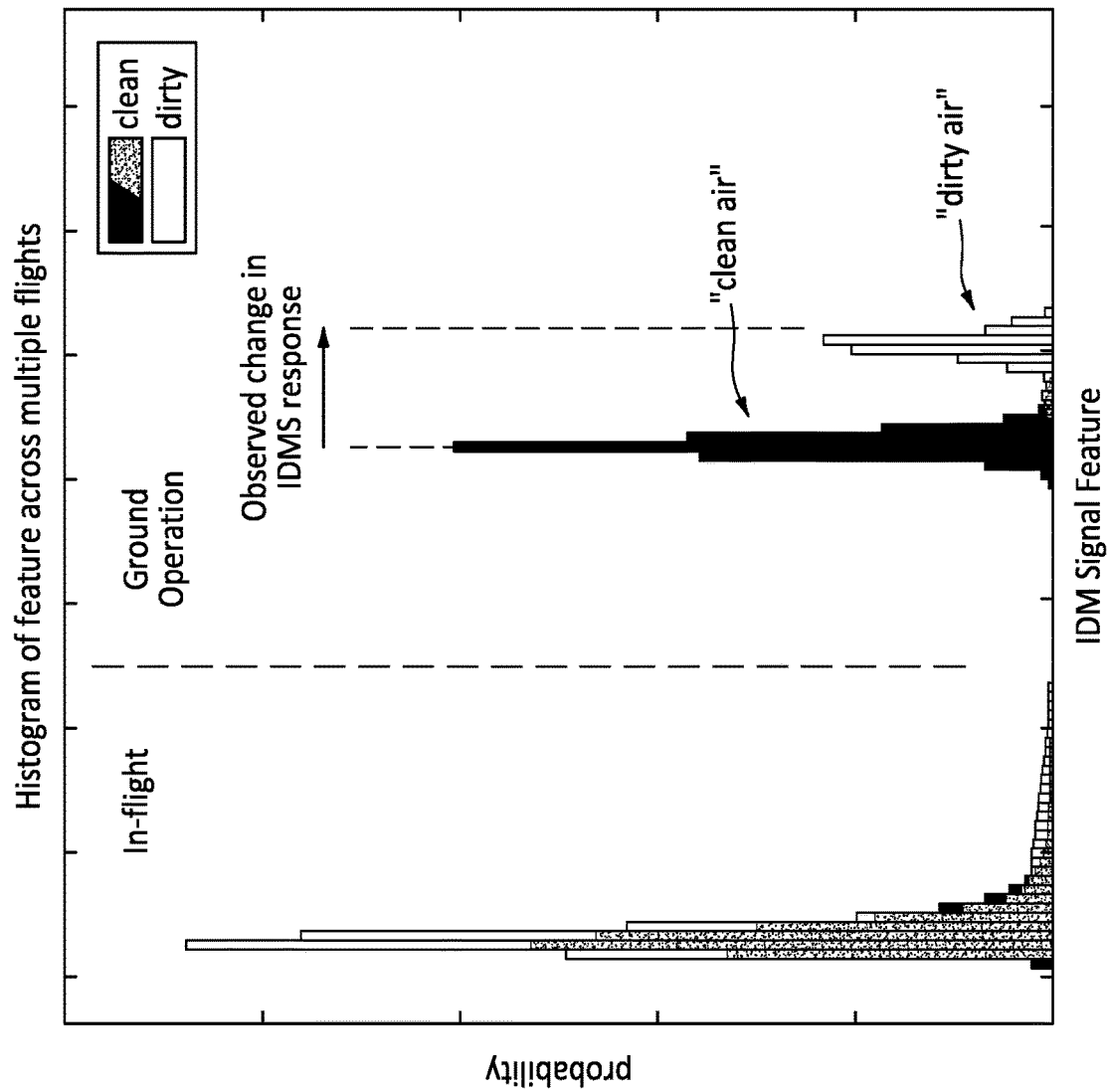
FIG. 3 is a graph of probability versus IDMS signal.

In the above determinations, the present disclosure utilizes a data feature that is representative of the CMAS particulate entrained within the inlet air. A non-limiting example of a data feature is the signal data produced by the IDMS 58. For example, FIG. 3 illustrates a graph of probability (of the presence of CMAS particulate within the inlet air) versus inlet debris monitoring (IDM) signal. As can be seen by the peaks indicated under the "ground operation" portion of the graph, the distribution of the IDMS signal changes appreciably between clean air and dirty air. The graph shown in FIG. 4 (probability versus standard deviation above the baseline) illustrates the IDMS signal deviations relative to a baseline. The data shown in FIG. 4 may be data collected during a single flight; e.g., a continuous amplitude-based measure of exposure to CMAS per "power-up-count" (or "PUC" which in this case is a single flight). In this manner, the data is collected over a full period of exposure and is useful as a complement to Boolean flag indicative of the presence or absence of a CMAS environment. The present disclosure is not limited to using IDMS signals as a data feature. Other parameters that are representative of CMAS particulate entrained within the inlet air may be used alternatively. In those embodiments that do use IDMS signals as a data feature, the data feature may take the form of a median value of the root mean square (RMS) of the IDMS signals during ground operations (or up to a predetermined altitude), or the data feature may take the form of an average value of the RMS of the IDMS signals during ground operations (or up to a predetermined altitude), or the like. The present disclosure is configured to evaluate data feature values in a plurality of different ways to determine whether an engine is operating in a CMAS environment. The graph shown in FIG. 5A shows data feature information as a function of time; e.g., data produced during at least a portion of a flight operational cycle, wherein a flight operational cycle may be defined as a cycle that includes, for example, engine start, engine idle, ground taxi, takeoff, cruise, landing, ground taxi, engine idle, engine off. The graph shown in FIG. 5A shows, more specifically, data feature information for a portion of a flight operational cycle as a function of time. The graph shown in FIG. 5A also shows a first data curve representing mean data values, a second data curve representing data trend limit low, and a third data curve representing data trend limit high. As is indicated in this graph, data feature values may be evaluated in terms of mean values and/or trends. The mean values may vary as a function of time (e.g., "start mean" to "end mean") but are representative of data at points in time. Trending, in contrast, is representative of data collected over a period of time and may provide insight into the determination of whether an engine 20 is operating in a CMAS environment perhaps not otherwise readily apparent. The graph shown in FIG. 5B shows the same data feature information as a function of time as is shown in FIG. 5A. The graph in FIG. 5B illustrates an analysis of the data feature; e.g., showing periods of time wherein the data feature is interpreted to mean that the engine 20 is deployed in a CMAS environment. As can be seen in the graph shown in FIG. 5B, the analysis may include the techniques to improve CMAS environment detection at the same time as minimizing the potential for a false identification of a CMAS environment. For example, the graph shown in FIG. 5B illustrates the use of an initial period of time to confirm the persistence of the difference in data feature prior to confirming the identification of a CMAS environment. Persistence length as a technique may be useful to eliminate brief periods wherein higher than normal particulate density within the inlet air is sensed, but is not representative of a CMAS environment. The use of a persistence length is a non-limiting example of a technique for improving CMAS environment detection and other techniques (e.g., window size, and the like) may be used alternatively.

Figure 4:
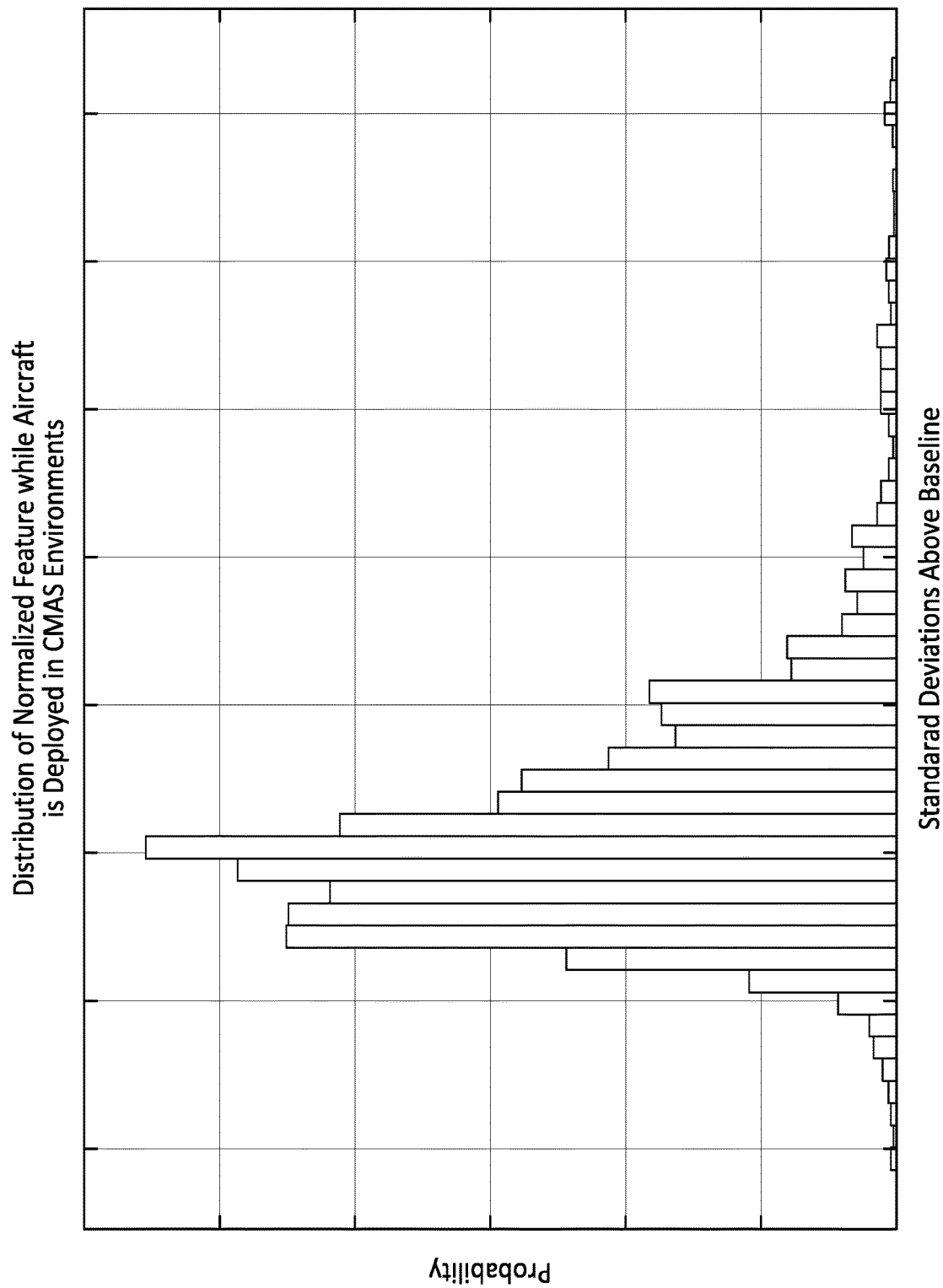
FIG. 4 is a graph of probability versus standard deviation above baseline.
Figure 5A:
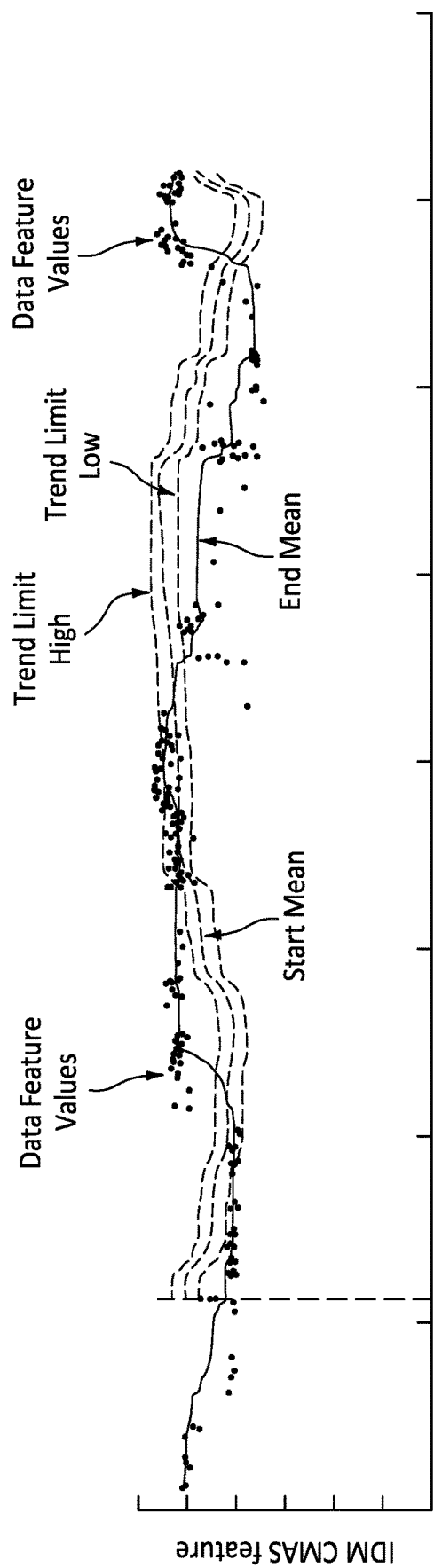
FIG. 5A is a graph of IDMS CMAS feature versus time.
Figure 5B:
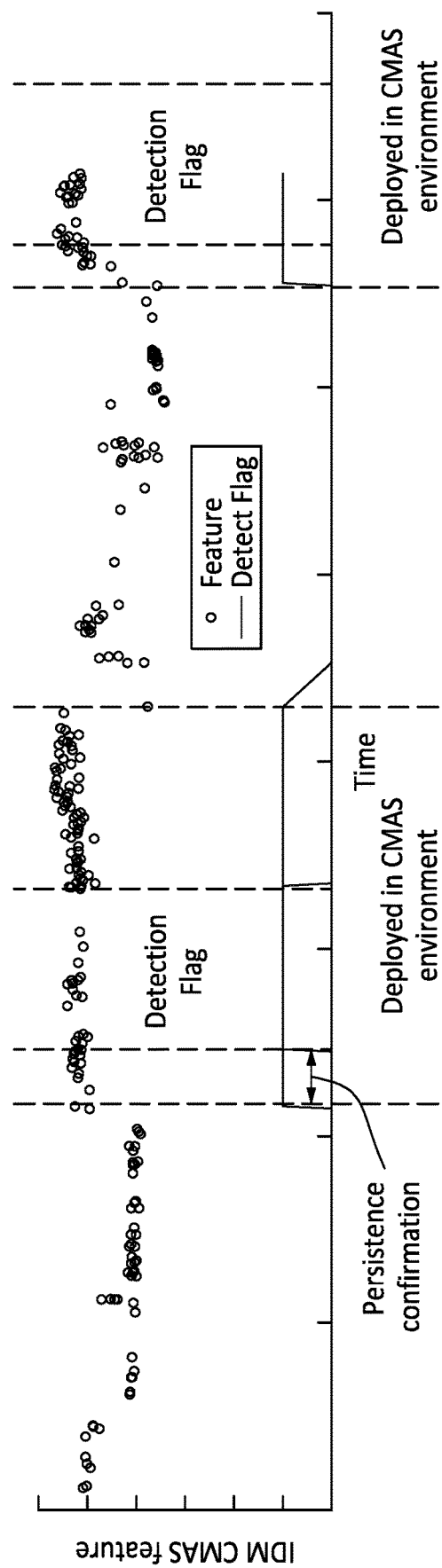
FIG. 5B is a graph of IDMS CMAS feature versus time.

Embodiments of the present disclosure are configured to provide information relating to cumulative exposure to a CMAS environment over a period of time; e.g., over a single flight (e.g., as shown in FIG. 4), or a predetermined number of flights, or operating hours, or the like. As indicated above, the graph shown in FIG. 4 (probability versus standard deviation above the baseline) illustrates the IDMS signal deviations relative to the baseline collected during a single flight; e.g., a continuous CMAS exposure parameter for the particular flight. The continuous exposure parameter is a quantifiable value that is representative of the deviations from the baseline over an extended period; e.g., over a single flight, or a predetermined number of flights, or operating hours, or the like. The aforesaid "baseline" may be representative of a threshold below which the level of entrained CMAS is not associated with deleterious effect, and above which the level of entrained CMAS is associated with deleterious effect. Alternatively, the baseline may be a threshold value subjectively selected. A baseline that is a fixed value based on data collected over a number of flights for a given engine 20 is understood to be preferred; e.g., such a baseline may be engine specific and sensing variability between different engines and different IDMS 58 can be mitigated or avoided. The present disclosure is not limited to any particular baseline other than one that is useful in providing CMAS environment information.

Figure 6A:
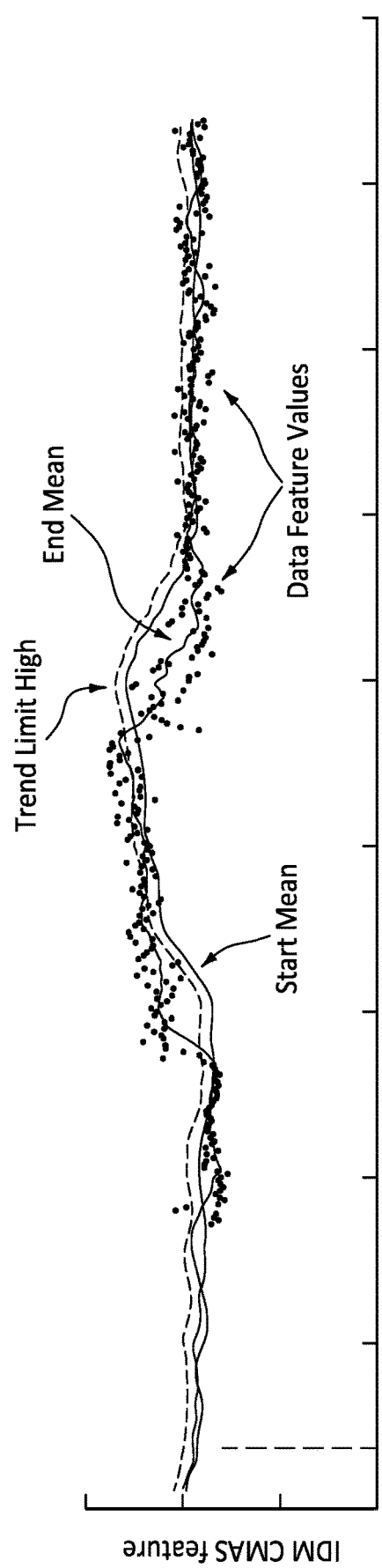
FIG. 6A is a graph of IDMS CMAS feature versus time.
Figure 6B:
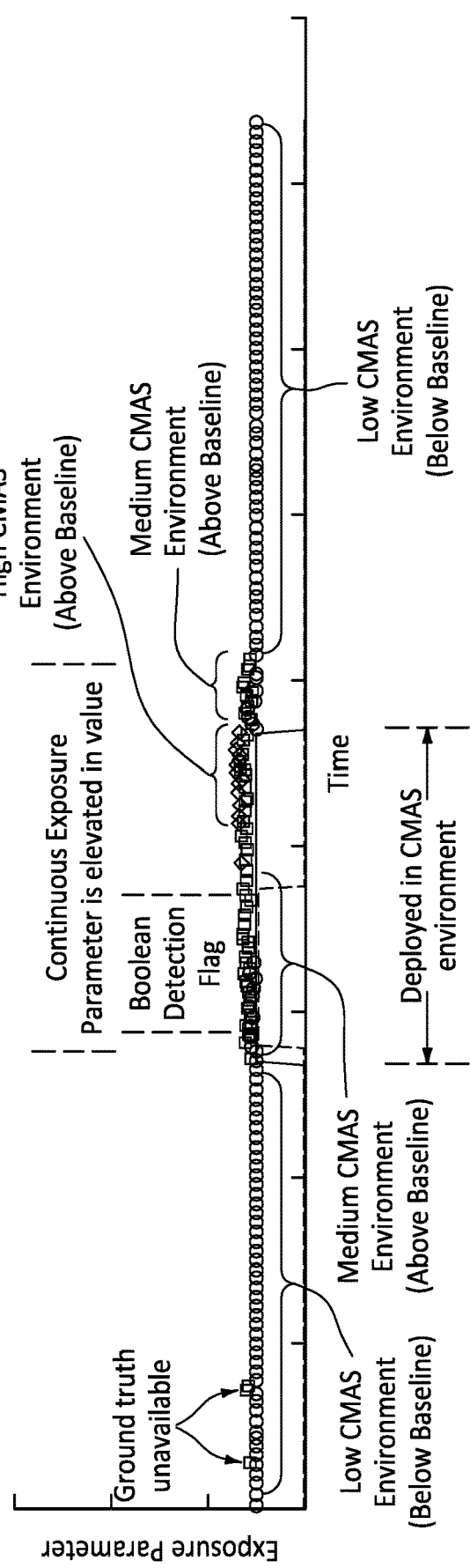
FIG. 6B is a graph of IDMS CMAS feature versus time.

The graph shown in FIG. 6A shows data feature magnitude as a function of time. The data shown in the graph of FIG. 6A is cumulative data; e.g., from a predetermined minimum number of flights. In addition, the graph shown in FIG. 6A shows a first data curve representing mean data values associated with a start mean, a second data curve representing mean data values associated with an end mean, and a third data curve representing data trend limit high. The graph shown in FIG. 6B shows the same feature data as is shown in FIG. 6A. The graph in FIG. 6B illustrates time periods wherein the IDMS signal data (and the data feature determined therefrom) do not exceed a baseline/threshold ("Low CMAS Environment") and periods of time wherein the IDMS signal data (and the data feature determined therefrom) do exceed a baseline/threshold (i.e., "Medium CMAS Environment" and "High CMAS Environment"). The degree to which the IDMS signal data exceeds the baseline or threshold (e.g., low, medium, or high CMAS Environment") can be used as an indicator of the CMAS particulate density within the inlet air. The graph in FIG. 6B illustrates when a Boolean flag may be produced based on IDMS signal data; e.g., in the first period of time with a "Medium CMAS Environment"). The Boolean flag and a quantification of the CMAS particulate density within the inlet air are examples of operational data that may be produced by the present disclosure. The graph of FIG. 6B also illustrates the period of time wherein a continuous exposure parameter is elevated in value; e.g., the period of time that encompasses the Medium CMAS Environments and the High CMAS Environment. The graph of FIG. 6B also illustrates the period of time when the present disclosure system has determined that the engine is deployed in a CMAS environment.

Embodiments of the present disclosure may be configured (e.g., via stored instructions executable by the controller 60) to mitigate or remove confounding affects. For example, ambient temperature may, in some instances, have a confounding effect on a data feature used to determine when an engine 20 is operating in a CMAS environment.

Figure 7:
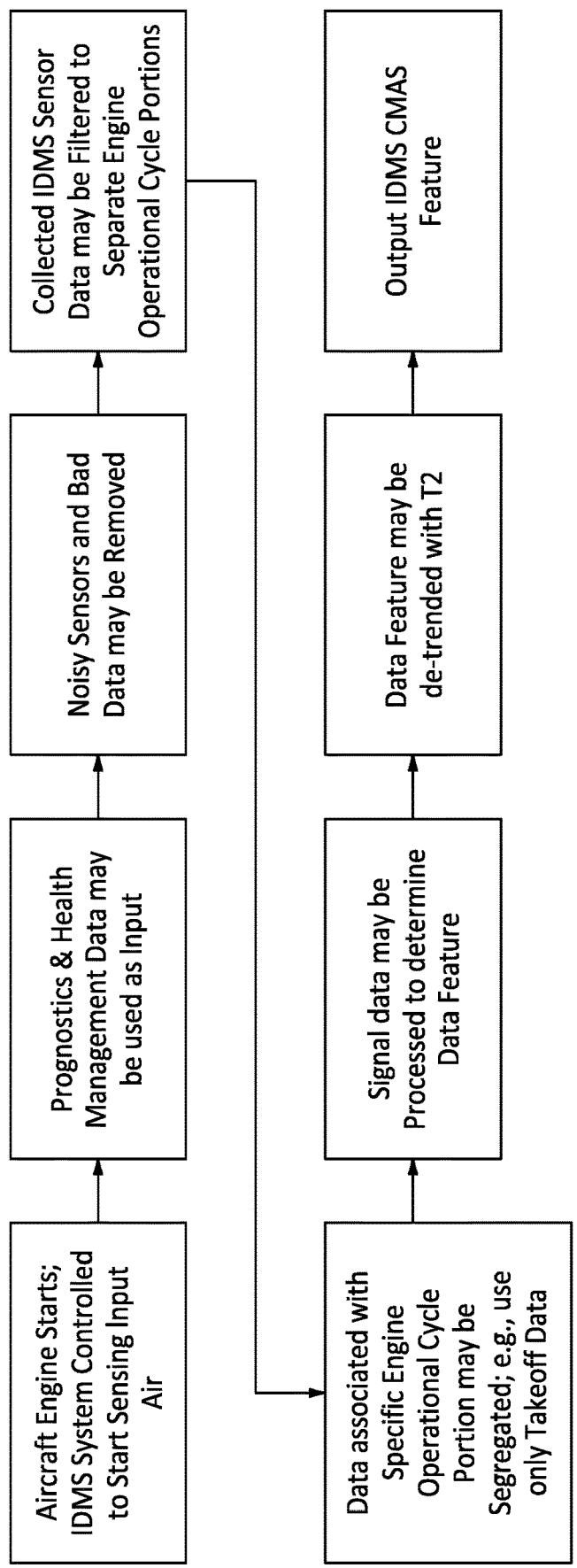
FIG. 7 is a flow chart illustrating an example of data feature development.

The flow chart of FIG. 7 illustrates a non-limiting example of how a CMAS data feature may be developed under embodiments of the present disclosure. Step 1 represents the initiation of the IDMS 58. Step 2 represents that in some embodiments prognostics and health management (PHM) data may be used as an input into the CMAS data feature determination. Step 3 represents that embodiments of the present disclosure may be configured to run diagnostics to determine whether a sensor (e.g., an IDMS sensor) is operating properly. If a sensor is operating in a manner outside of predetermined parameters, the sensor signals from that sensor and the data produced therefrom may be discarded. Step 4 represents that the present disclosure signal processing may include signal filtering to isolate certain portions of the flight operational cycle (e.g., engine idle, ground taxi, takeoff, cruise, landing, and the like) from others. Step 5 represents that in some embodiments, the present disclosure signal processing may include signal filtering to further isolate certain portions of the flight operational cycle (e.g., isolate takeoff from all other portions). As stated above, the present disclosure permits a user to selectively limit analysis (e.g., determination of the presence or absence of CMAS, the CMAS particulate density, and the like) to those portions of a flight operational cycle when the engine 20 is most likely to be exposed to a CMAS environment. In this manner, the present disclosure system can function more efficiently. Step 6 represents that the IDMS sensor data signals may be processed to determine which data feature is most appropriate, or conversely to determine one or more preselected data features. Step 7 represents that some present disclosure embodiments may include a detrending step of different periods of data. For example, data collected over a longer period of time may reveal trends. In some instances, the trends may be indicative of useful information associated with an engine exposure to a CMAS environment. In other instances, the trends may be associated with confounding factors (e.g., onboard equipment noise and the like) that are unrelated to an engine exposure to a CMAS environment. In these latter instances, a detrending step can be implemented to mitigate the data trending associated with one or more confounding factors and thereby increase the integrity of the data. Step 8 represents the output of the CMAS data feature that can subsequently be used for purposes of identifying the presence or absence of a CMAS environment, the CMAS particulate density within the inlet air, or the cumulative CMAS environment, or the like, or any combination thereof.

Figure 8:
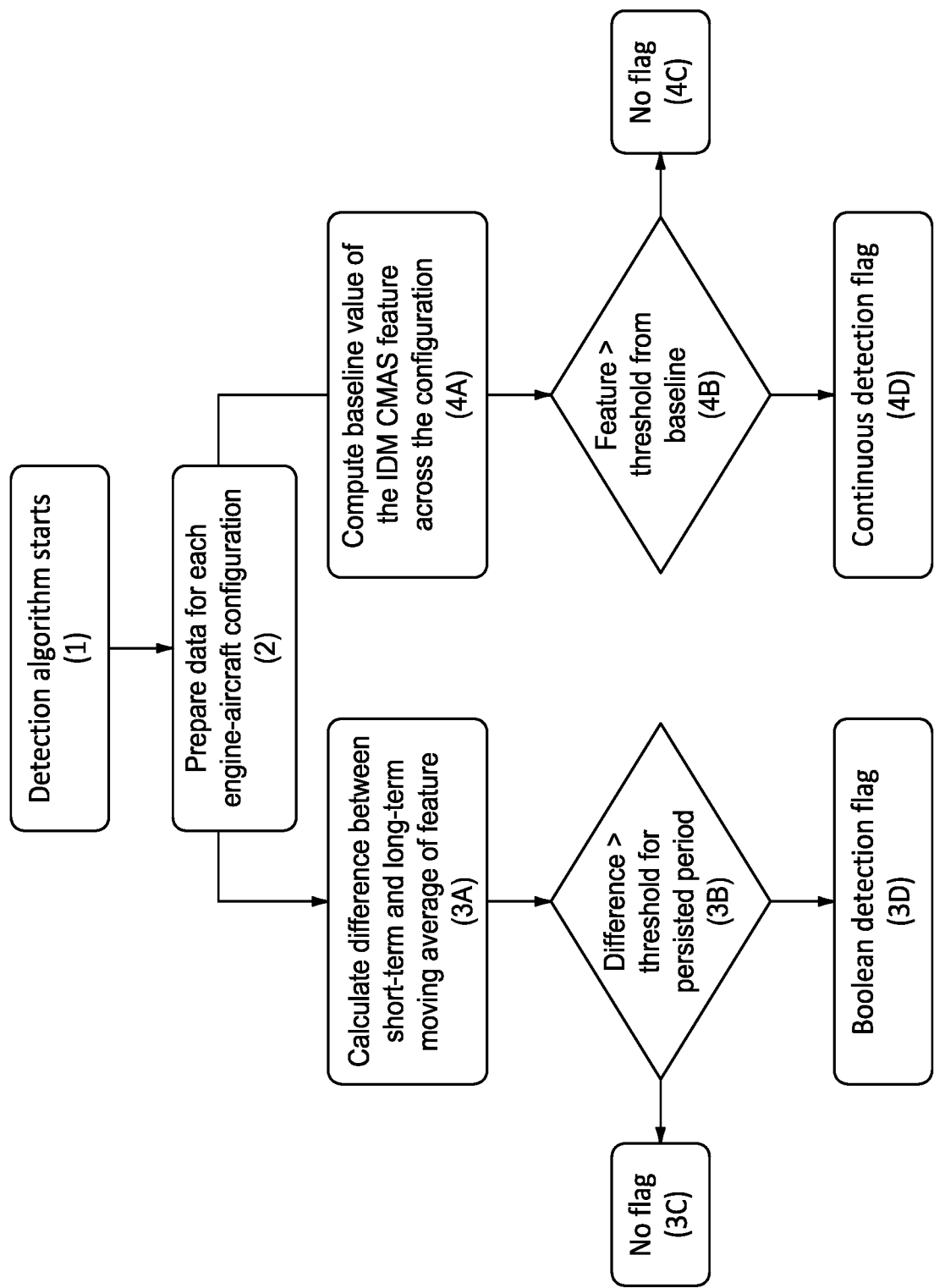
FIG. 8 is a flow chart illustrating an example of a present disclosure methodology.

The flow chart of FIG. 8 illustrates a non-limiting example of a present disclosure methodology. Step 1 represents the initiation of the IDMS 58. Step 2 represents that the system may prepare data for each engine-aircraft configuration; i.e., the data developed may be specific to particular engines on a particular aircraft. The chart branch represented by Steps 3A-3D reflects the development of cumulative CMAS information that may be associated with multiple flight operational cycles. The chart branch represented by Steps 4A-4D reflects the development of CMAS information that may be associated with a given flight operational cycle.

Step 3A represents that some embodiments of the present disclosure may include signal processing that includes the use of averaging (e.g., the determination of value averages, or mean values, or the like) in the determination of a data feature. Step 3B represents that some embodiments of the present disclosure may include a comparison (or similar algorithmic function) of the data feature relative to a threshold value (or the like) over a predetermined period of time in a determination of whether a CMAS environment is present. Step 3C represents a determination that the sensed IDMS signals and the data feature determined therefrom do not indicate that a CMAS environment is present, so no CMAS environment indicator is produced. Step 3D represents a determination that the sensed IDMS signals and the data feature determined therefrom do indicate that a CMAS environment is present, so a CMAS environment indicator (e.g., a Boolean detection flag) is produced.

Step 4A represents that some embodiments of the present disclosure may include determining a baseline (or threshold, or the like) of the IDMS CMAS data feature over a cumulative period of time for a given engine 20 and/or the engines of an aircraft. Step 4B represents that some embodiments of the present disclosure may include comparison (or similar algorithmic function) of the data feature relative to the baseline (or the like) in a determination of whether a CMAS environment is present. Step 4C represents a determination that the sensed IDMS signals and the data feature determined therefrom do not indicate that a CMAS environment is present, so no continuous detection flag is produced. Step 4D represents a determination that the sensed IDMS signals and the data feature determined therefrom do indicate that a CMAS environment is present, so a continuous detection flag is produced.

The ability of the present disclosure to provide information regarding the degree to which an engine 20 operates in a CMAS environment (e.g., whether or not the engine 20 is operating in a CMAS environment, the duration of time that the engine 20 is operating in a CMAS environment, the CMAS particulate density in the inlet air during engine operation, and the like) is understood to be quite valuable for maintenance purposes, and more specifically as input into lifting algorithms. A significant portion of engine operating costs is associated with maintenance and maintenance costs are driven at least in part by inspection requirements. Lifting models are typically used to predict the useful life of an engine component. CMAS exposure has resulted in premature engine maintenance and the failure to consider CMAS environment can render lifting models inaccurate. The present disclosure can provide accurate CMAS environment exposure information and that information, in turn, can greatly improve the ability to predict when an engine may need maintenance as a result of CMAS environment exposure. In this manner, the present disclosure supports condition based maintenance (CBM) and the improved maintenance cost savings associated therewith.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted is a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A method of producing cumulative operational data for an aircraft turbine engine, comprising:
    (a) sensing an inlet airflow to an aircraft turbine engine for calcium-magnesium-alumino-silicate (CMAS) particulate matter, the sensing performed during one or more ground portions of a flight operational cycle of the turbine engine, the sensing producing sensor signals indicative of the presence or absence of the CMAS particulate matter;
    (b) determining a presence or absence of an exposure by the turbine engine to a CMAS environment based on the sensor signals; and
    (c) repeating steps (a)-(b) over a predetermined amount of time and producing cumulative operational data indicative of the presence or absence of said exposure by the turbine engine to said CMAS environment over said predetermined amount of time.

2. The method of claim 1, wherein the sensing is performed using an inlet debris monitoring system (IDMS) that uses a pair of rings to sense changes in electrostatic charge.

3. The method of claim 2, wherein the determining includes evaluating the sensor signals relative to a baseline.

4. The method of claim 3, wherein the baseline is a fixed value based on sensing data.

5. The method of claim 4, wherein the operational data is collected over a plurality of flights of the turbine engine.

6. The method of claim 3, wherein the baseline is indicative of a density of said CMAS particulate matter within the inlet airflow that is not associated with deleterious effect to the turbine engine.

7. The method of claim 1, wherein the step of producing said cumulative operational data includes producing flags indicative of the presence or absence of a CMAS environment.

8. The method of claim 1, wherein the step of producing said cumulative operational data includes producing cumulative data relating to a magnitude of a CMAS environment to which the turbine engine is exposed.

9. The method of claim 1, wherein the step of producing said cumulative operational data includes producing data relating to a cumulative exposure of the turbine engine to one or more said CMAS environments.

10. The method of claim 9, wherein the cumulative exposure is determined based on said sensor signals collected over a plurality of said flight operational cycles of the turbine engine.

11. The method of claim 9, wherein the cumulative exposure is determined based on said sensor signals collected over said predetermined amount of time, elapsed during a plurality of said flight operational cycles of the turbine engine.

12. The method of claim 1, wherein the one or more ground portions of a flight operational cycle of the turbine engine includes a ground idle portion and a takeoff portion, and the sensing is performed only during the ground idle portion and the takeoff portion.

13. The method of claim 1, wherein the one or more ground portions of a flight operational cycle of the turbine engine includes a takeoff portion and a landing portion, and the sensing is performed only during the takeoff portion and the landing portion.

14. The method of claim 1, wherein the one or more ground portions of a flight operational cycle of the turbine engine includes a takeoff portion, and the sensing is performed only during the takeoff portion.

15. A system for producing cumulative operational data for an aircraft turbine engine having an airflow inlet, comprising:
    an inlet debris monitoring system (IDMS) configured to sense an inlet air flow to the turbine engine for calcium-magnesium-alumino-silicate (CMAS) particulate matter, the IDMS configured to produce sensor signals indicative of the presence or absence of the CMAS particulate matter;
    a controller in communication with the IDMS and a non-transitory memory storing instructions, which instructions when executed cause the controller to:
        control the IDMS to sense the inlet air flow for CMAS particulate matter during one or more ground portions of a flight operational cycle of the turbine engine, and produce the sensor signals indicative of the presence or absence of the CMAS particulate matter;
        determine a presence or absence of an exposure by the turbine engine to a CMAS environment based on the sensor signals; and
        produce an operational data indicative of the presence or absence of said exposure by the turbine engine to said CMAS environment,
    wherein in the production of said operational data indicative of the presence or absence of said exposure to said CMAS environment, the instructions cause the controller to produce data relating to a cumulative exposure of the turbine engine to one or more CMAS environments.

16. The system of claim 15, wherein in the determination of the presence or absence of said exposure by the turbine engine to said CMAS environment based on the sensor signals, the instructions cause the controller to evaluate the sensor signals relative to a baseline value.

17. The system of claim 15, wherein in the production of said operational data indicative of the presence or absence of said exposure to said CMAS environment, the instructions cause the controller to produce a flag indicative of the presence or absence of a CMAS environment.

18. The system of claim 15, wherein in the production of said operational data indicative of the presence or absence of said exposure to said CMAS environment, the instructions cause the controller to produce data relating to a magnitude of a said CMAS environment to which the turbine engine is exposed.

19. The system of claim 15, wherein the one or more ground portions of a flight operational cycle of the turbine engine includes a ground idle portion and a takeoff portion, and the controller controls the IDMS to sense the inlet air flow for CMAS particulate matter only during the ground idle portion.

* * * * *